United States Patent [19]
Cheng et al.

[11] Patent Number: 5,873,092
[45] Date of Patent: *Feb. 16, 1999

[54] INFORMATION HANDLING SYSTEM, METHOD, AND ARTICLE OF MANUFACTURE INCLUDING PERSISTENT, DISTRIBUTED OBJECT NAME SERVICES INCLUDING SHARED PROPERTIES

[75] Inventors: Philip Yen-Tang Cheng; George P. Copeland, both of Austin; Robert Howard High, Jr., Round Rock; Vinoj Narayan Kumar, Austin, all of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 572,696

[22] Filed: Dec. 14, 1995

[51] Int. Cl.$^6$ ............................................. G06F 17/30
[52] U.S. Cl. .............................................. 707/103; 707/104
[58] Field of Search ................................... 395/600, 614, 395/200.03, 425, 612, 601; 371/20.1; 364/900, 419; 370/60; 707/103, 104, 101, 102, 100

[56] References Cited

U.S. PATENT DOCUMENTS

| | | | |
|---|---|---|---|
| 4,514,800 | 4/1985 | Gruner et al. | 395/379 |
| 4,525,780 | 6/1985 | Bratt et al. | 364/200 |

(List continued on next page.)

OTHER PUBLICATIONS

"Designing a Global Name Service," *Proceedings of Fifth Symposium on the Principles of Distributed Computing. ACM*, pp. 1–10, 1986.

"Understanding Naming in Distributed Systems," *Distributed Computing*, vol. 3, No. 2, 1989, pp. 51–60.

"Enabling of Controls for Participation in Direct Manipulation," *IBM Technical Disclosure Bulletin*, vol. 33, No. 6A, Nov. 1990, pp. 463–464.

"Implementation of an Optimistic Lock Mechanism for Persistent Objects Within an Object–Oriented Environment," *IBM Technical Disclosure Bulletin*, vol. 33, No. 9, Feb. 1991, pp. 466–471.

"Four–Address Virtual Memory," *IBM Technical Disclosure Bulletin*, vol. 33, No. 10A, Mar. 1991, pp. 234–237.

"Extensible and Configurable Audit Event Types and Classes," *IBM Technical Disclosure Bulletin*, vol. 34, No. 8, Jan. 1992, pp. 138–141.

"Bindings Between Names and Objects in a Persistent System," *IEEE Comput. Soc. Press*, Sep. 1992, pp. 26–37.

"Lightweight Shared Objects in a 64–bit Operating System," *SIGPLAN Notices (USA)*, vol. 27, No. 10, Oct. 1992, pp. 397–413.

"Maintaining Information About Persistent Replicated Objects in a Distributed System," *IEEE Comput. Soc. Press*, Cat. No. 93CH3282–1, May 1993, pp. 491–498.

"Persistent Framework Independent Record/Playback Framework," *IBM Technical Disclosure Bulletin*, vol. 36, No. 6A, Jun. 1993, pp. 261–264.

(List continued on next page.)

*Primary Examiner*—Thomas G. Black
*Assistant Examiner*—Frantz Coby
*Attorney, Agent, or Firm*—Mark S. Walker; George E. Clark

[57] ABSTRACT

An information handling system includes one or more work stations, each work station including one or more processing units, a memory system, and one or more I/O controllers all connected to a system bus, the I/O controllers controlling various input/output devices such as a keyboard, a mouse, a display device, communications adapters and the like, an operating system control means employing object oriented technology, and means for providing a persistent, distributed object name service. An object class is modeled as a set of relationships. One or more files are constructed which exist in the file system, each of the files capturing the semantics of the naming context objects.

33 Claims, 10 Drawing Sheets

U.S. PATENT DOCUMENTS

| | | | |
|---|---|---|---|
| 4,814,971 | 3/1989 | Thatte | 364/200 |
| 4,853,842 | 8/1989 | Thatte et al. | 364/200 |
| 4,914,590 | 4/1990 | Loatman et al. | 364/419 |
| 4,953,080 | 8/1990 | Dysart et al. | 364/200 |
| 4,989,132 | 1/1991 | Mellender et al. | 364/200 |
| 5,008,786 | 4/1991 | Thatte | 364/200 |
| 5,008,853 | 4/1991 | Bly et al. | 364/900 |
| 5,016,162 | 5/1991 | Epstein et al. | 364/200 |
| 5,043,871 | 8/1991 | Nishigaki et al. | 364/200 |
| 5,047,925 | 9/1991 | Kun et al. | 364/200 |
| 5,075,845 | 12/1991 | Lai et al. | 395/425 |
| 5,075,848 | 12/1991 | Lai et al. | 395/425 |
| 5,093,914 | 3/1992 | Coplien et al. | 395/700 |
| 5,095,480 | 3/1992 | Fenner | 370/94.1 |
| 5,111,413 | 5/1992 | Lazansky et al. | 364/578 |
| 5,136,712 | 8/1992 | Perazzoli, Jr. et al. | 395/700 |
| 5,163,148 | 11/1992 | Walls | 395/600 |
| 5,185,885 | 2/1993 | Dysart et al. | 395/600 |
| 5,220,657 | 6/1993 | Bly et al. | 395/425 |
| 5,261,052 | 11/1993 | Shimamoto et al. | 395/200 |
| 5,265,221 | 11/1993 | Miller | 395/725 |
| 5,276,872 | 1/1994 | Lomet et al. | 395/600 |
| 5,280,610 | 1/1994 | Travis, Jr. et al. | 395/600 |
| 5,283,830 | 2/1994 | Hinsley et al. | 380/25 |
| 5,287,453 | 2/1994 | Roberts | 395/200 |
| 5,291,283 | 3/1994 | Kondo et al. | 348/390 |
| 5,291,583 | 3/1994 | Bapat | 395/500 |
| 5,295,256 | 3/1994 | Bapat | 395/500 |
| 5,297,279 | 3/1994 | Bannon et al. | 395/600 |
| 5,297,283 | 3/1994 | Kelly, Jr. et al. | 395/650 |
| 5,301,286 | 4/1994 | Rajani | 395/400 |
| 5,301,316 | 4/1994 | Hamilton et al. | 395/600 |
| 5,303,375 | 4/1994 | Collins et al. | 395/650 |
| 5,317,742 | 5/1994 | Bapat | 395/700 |
| 5,321,841 | 6/1994 | East et al. | 395/725 |
| 5,325,524 | 6/1994 | Black et al. | 395/600 |
| 5,333,317 | 7/1994 | Dann | 707/5 |
| 5,335,323 | 8/1994 | Kolnick | 395/164 |
| 5,341,478 | 8/1994 | Travis, Jr. et al. | 395/200 |
| 5,343,554 | 8/1994 | Koza et al. | 395/13 |
| 5,363,313 | 11/1994 | Lee | 364/491 |
| 5,369,702 | 11/1994 | Shanton | 380/4 |
| 5,369,778 | 11/1994 | San Soucie et al. | 395/800 |
| 5,377,323 | 12/1994 | Vasudevan | 395/200 |
| 5,379,432 | 1/1995 | Orton et al. | 395/700 |
| 5,404,506 | 4/1995 | Fujisawa et al. | 395/600 |
| 5,404,508 | 4/1995 | Konrad et al. | 395/600 |
| 5,404,529 | 4/1995 | Chernikoff et al. | 395/700 |
| 5,408,649 | 4/1995 | Beshears et al. | 395/575 |
| 5,412,774 | 5/1995 | Agrawal et al. | 395/157 |
| 5,414,840 | 5/1995 | Rengarajan et al. | 395/600 |
| 5,421,012 | 5/1995 | Khoyi et al. | 395/650 |
| 5,421,015 | 5/1995 | Khoyi et al. | 395/650 |
| 5,426,780 | 6/1995 | Gerull et al. | 395/614 |
| 5,434,974 | 7/1995 | Loucks et al. | 395/200 |
| 5,436,909 | 7/1995 | Dev et al. | 371/20.1 |
| 5,437,027 | 7/1995 | Bannon et al. | 395/600 |
| 5,497,463 | 3/1996 | Stein et al. | 395/200.03 |
| 5,499,371 | 3/1996 | Henninger et al. | 395/700 |
| 5,504,885 | 4/1996 | Alashqur | 395/614 |
| 5,548,749 | 8/1996 | Kroenke et al. | 395/614 |
| 5,550,816 | 8/1996 | Hardwick et al. | 370/60 |
| 5,557,793 | 9/1996 | Koerber | 395/600 |
| 5,577,252 | 11/1996 | Nelson et al. | 395/670 |
| 5,581,755 | 12/1996 | Koerber et al. | 395/614 |
| 5,596,746 | 1/1997 | Shen et al. | 395/612 |
| 5,615,362 | 3/1997 | Jensen et al. | 395/614 |
| 5,706,501 | 1/1998 | Horikiri et al. | 707/10 |
| 5,745,683 | 4/1998 | Lee et al. | 395/200.8 |
| 5,764,984 | 6/1998 | Loucks | 395/682 |

OTHER PUBLICATIONS

"Associative Access Capability in ALeFs Distributed File System," *Transactions on the Information Processing Society of Japan*, vol. 34, No. 6, Jun. 1993, pp. 1478–1485 (abstract only).

"Software Control of Multimedia Device Interconnection," *IBM Technical Disclosure Bulletin*, vol. 36, No. 9B, Sep. 1993, pp. 569–572.

"Persistence in Spring System," *IEEE Comput. Soc. Press*, Cat. No. 93TH0601-5, 1993, pp. 12–23.

*An Introduction to Database Systems*, 6th Edition, C. Date, Adison–Wesley System Programming Series, 1994 (textbook—cited for general background knowledge; copy not provided).

"Introducing the Third Manifesto," *Database Programming & Design*, 1994, pp. 25–35.

"Common Object Services Specification," *IBM Object Management Group*, vol. III, pp. 193–286, 1994.

"Action Objects with Persistent IDs," *IBM Technical Disclosure Bulletin*, vol. 37, No. 7, Jul. 1994, pp. 639–640.

"Orthogonal persistence in a heterogeneous distributed object oriented environment," *The Computer Journal*, vol. 37, No. 6, 1994, pp. 531–541.

"Objects to the Rescue! Or httpd: the next generation operating system," *Operating System Review (USA)*, vol. 29, No. 1, Jan. 1995, pp. 91–95.

5,873,092

INFORMATION HANDLING SYSTEM, METHOD, AND ARTICLE OF MANUFACTURE INCLUDING PERSISTENT, DISTRIBUTED OBJECT NAME SERVICES INCLUDING SHARED PROPERTIES

TECHNICAL FIELD OF THE INVENTION

The present invention relates to information handling systems, methods and articles of manufacture, and more particularly to information handling systems and methods for implementing object name services including shared properties in an object oriented system.

BACKGROUND OF THE INVENTION

A related copending application (Ser. No. 08/537,648) teaches and claims an information handling system, method and article of manufacture for automatically inserting object services such as persistence, concurrency, recoverability, security and distribution into binary classes in an information handling system employing object oriented technology. The related invention includes registering a description of a class in a name service context, and searching the name service context for a class object referred to as a factory, among other elements of the invention.

Another related copending application (Ser. No. 08/554,063) teaches and claims an information handling system, method and article of manufacture for supporting properties (data about bindings), searching (finding bindings given constraints on properties) and indexing (for speeding up the search on certain property names).

To accomplish the goals of the related inventions, an object name service is needed. The name service should have the following characteristics:

1. Support binding objects to names;
2. Support associating properties with an object binding;
3. Support properties per binding or properties across bindings for an object;
4. Support searching for objects based on object properties;
5. Support multilevel searches; and
6. Support indexing to permit scaling to large numbers of objects and properties.

Additionally, a distributed object name service should allow users to resolve a name when it needs to access the object. Consequently, it is important that the name space implemented by a name server not disappear even if the server which implements the name space terminates and restarts. Also, it is desirable that any mechanism that provides persistence be simple, scalable, and efficient.

An object name server must implement one or more Naming Context objects. Naming contexts offer users a mechanism to map names to objects to properties, where names are strings and properties are name value pairs. Since a context is like any other object, it can also be bound to names in a naming context. These contexts create a naming graph, which is a directed graph with nodes and labeled edges where nodes are contexts. Naming contexts offer a variety of ways to register or unregister objects and their properties, add or remove individual properties, look up properties of an object, and search for objects based on constraints on the properties. Name bindings and the properties attached to the name bindings represent the state of naming contexts. Naming contexts also allow local owned properties, shared properties, soft links, and hard links.

Systems that merely hold the name object bindings in memory implement a transient name space which disappears when the server process terminates. Such a system lacks persistence and is not acceptable. A naming system should have a relatively small storage requirement, for example, less than 5 megabytes and moderate update rates.

Although commercial databases satisfy the above criteria, engineering such a system is a major task and requires a large investment in time and money. Rather than architecting a new database which satisfies the constraints, if existing databases can be used to act as datastores, dramatic savings in time and money can be achieved.

Storing contexts as persistent objects has several drawbacks. First, the context objects must be decomposed into sub-objects in order to make some of the dynamic state persistent. Externalization stream out and stream in operations have to be provided in order to flatten and unflatten the object. Data would then have to be stored in record files. This representation makes searches based on constraints on properties extremely slow and inefficient. Updates have to be done in memory and checkpointed to disk periodically which leads to synchronization problems. It is not practical to produce good performance with such a technique, and its applicability is restricted to naming implementations with very low rate of inquiries and updates.

PRIOR ART

In the prior art there are many techniques for improving object oriented programming systems (OOPS).

The following are examples of the prior art.

U.S. Pat. No. 5,434,974 teaches a naming system and method for managing object identification in a network of computer systems. The naming system employs data structures stored in the memory of the computer systems containing character strings and corresponding addresses to entries in the data structures and objects in the computer systems. Names in a particular computer system that correspond to objects in another computer system are resolved by a border data structure capable of transforming names, delimiters, and visas across computer systems.

U.S. Pat. No. 5,093,914 generally teaches a method used by a digital computer in controlling execution of an object oriented program to effect a defined action, for example, stopping the program when a specified virtual function is invoked on a specified object during execution of the program.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patents generally deal with methods for controlling execution of object oriented programs, the patents do not teach nor suggest providing persistence of name-property-object bindings as is taught and claimed herein with reference with the present invention.

SUMMARY OF THE INVENTION

It is an object of the present invention to provide a persistent, distributed object name service in an object oriented information handling system.

Accordingly, an information handling system includes one or more work stations, each work station including one or more processing units, a memory system, and one or more I/O controllers all connected to a system bus, the I/O controllers controlling various input/output devices such as a keyboard, a mouse, a display device, communications adapters and the like, an operating system control means employing object oriented technology, and means for providing a persistent, distributed object name service. An object class is modeled as a set of relationships. One or more files are constructed which exist in the file system, each of the files capturing the semantics of the naming context objects.

It is an advantage of the present invention that a persistent, distributed object name service can be efficiently incorporated in a naming context module in an information handling system.

DETAILED DESCRIPTION OF A PREFERRED EMBODIMENT OF THE INVENTION

Figure 1:
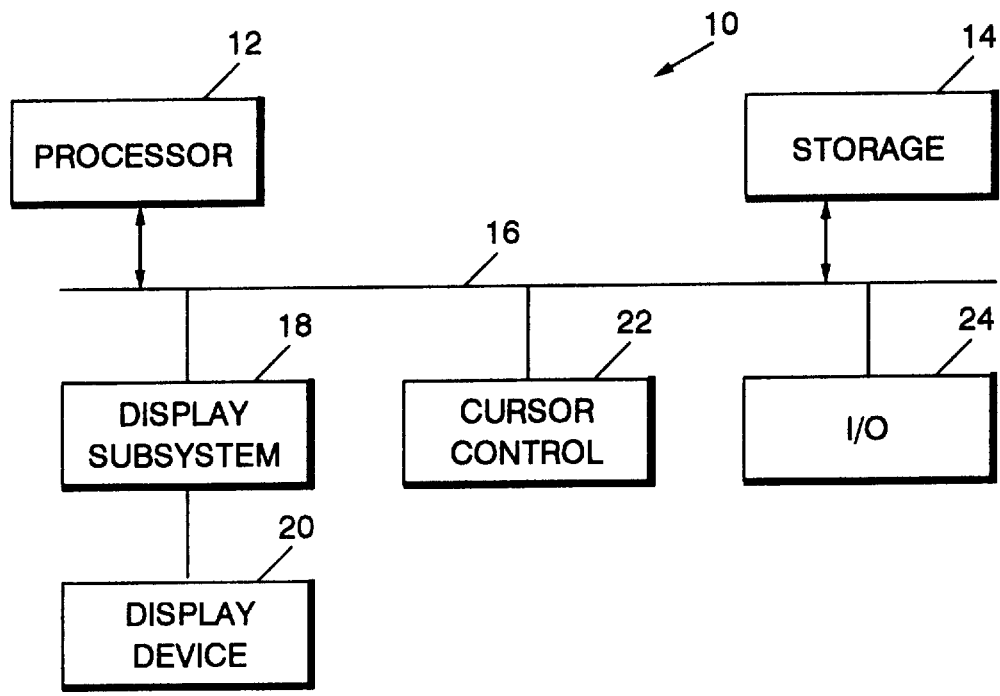
FIG. 1 is a block diagram of a system according to the present invention.
Figure 2:
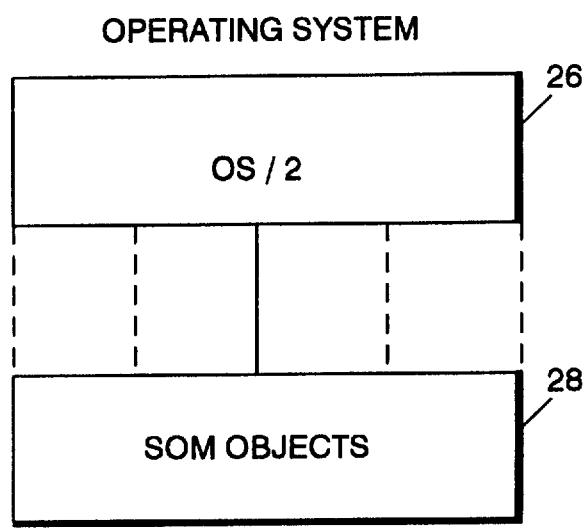
FIG. 2 is a block diagram showing the operating system platform and system object model program supporting the present invention.

Referring now to FIGS. 1 and 2, an information handling system 10 and an operating system environment for the present invention will be described.

Information handling system 10 may be a graphics work station or the like or a network of such work stations each work station having one or more processors 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multi-tasking operating system such as OS/2* (OS/2 is a registered trademark of International Business Machines Corporation). Among many tasks which the OS/2 operating system controls in operating information handling system 10, is execution of a program DSOM Objects, which is a commercially available product of International Business Machines Corporation.

The method and article of manufacture of the present invention may be incorporated in the DSOM Objects program.

Figure 3A:
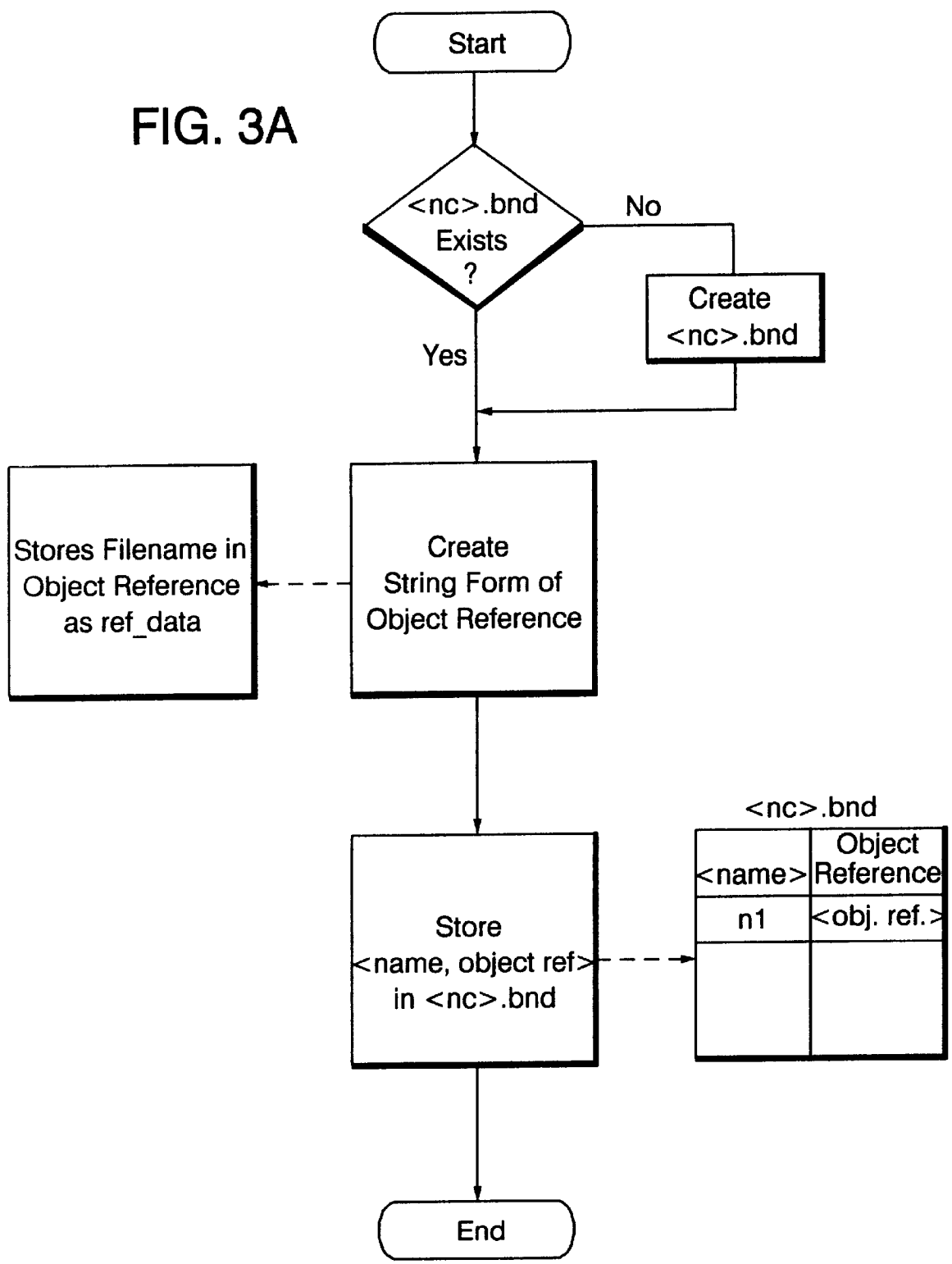
FIG. 3A, B, C, D and E are flow diagrams illustrating the method in accordance with the present invention.

OPERATION OF A PREFERRED EMBODIMENT OF THE INVENTION (A) Operations that do binding (bind, bind_context, rebind, rebind_context) will go through the following steps: (See FIG. 3A)

Figure 3B:
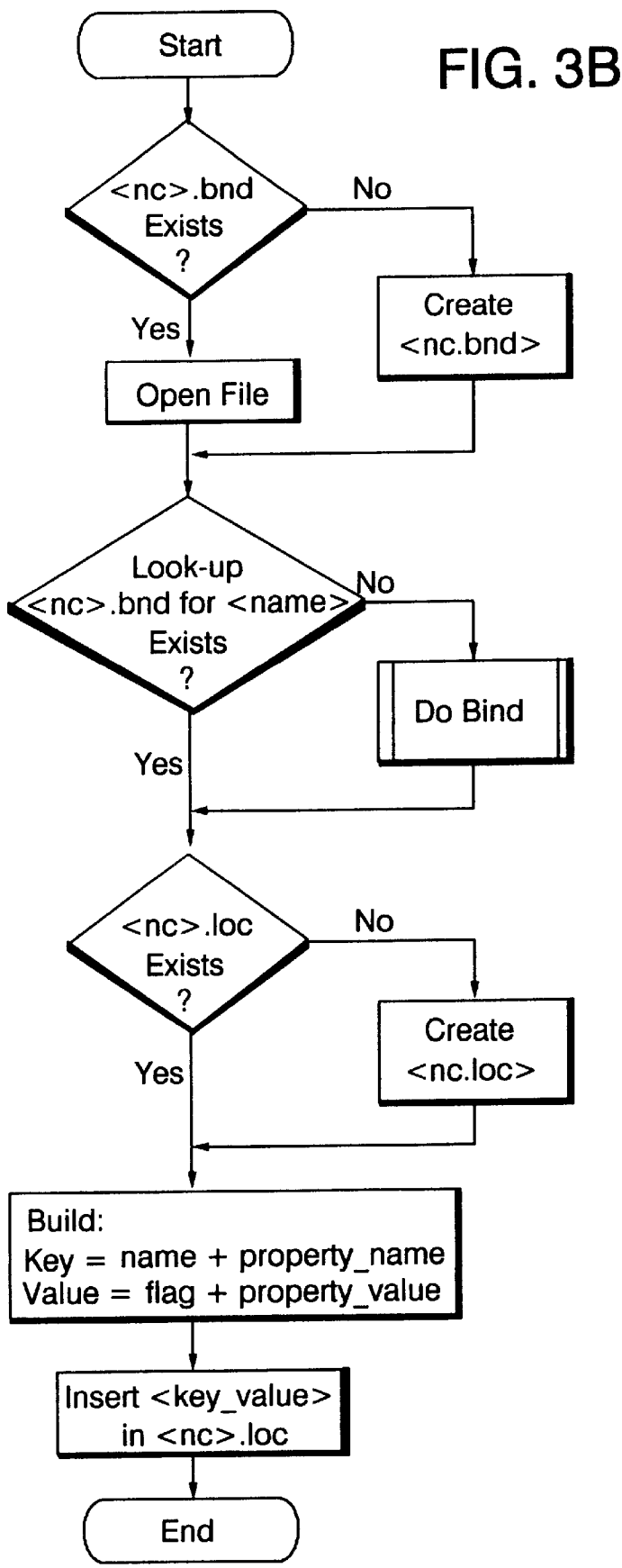

1. If the <nc>.bnd file does not exist, create one.
2. Create a stringified object reference of the object to be bound.
3. Insert the record, <name, stringified-ref> in <nc>.bnd (B) Operations that add/update properties (bind_with_properties, rebind_context_with_properties, bind_context_with_properties, rebind_context-with_properties, add_property, add_properties) do the following: (See FIG. 3B)

1. Do steps 1–3 of the bind operations.
2. if <nc>.loc file does not exist, create one.
3. Build the key → the binding name and the property name constitute the key.
4. Build the key-value → sharable flag + property value.
5. Insert record in the <nc>.loc file.

Figures 1, 3C:
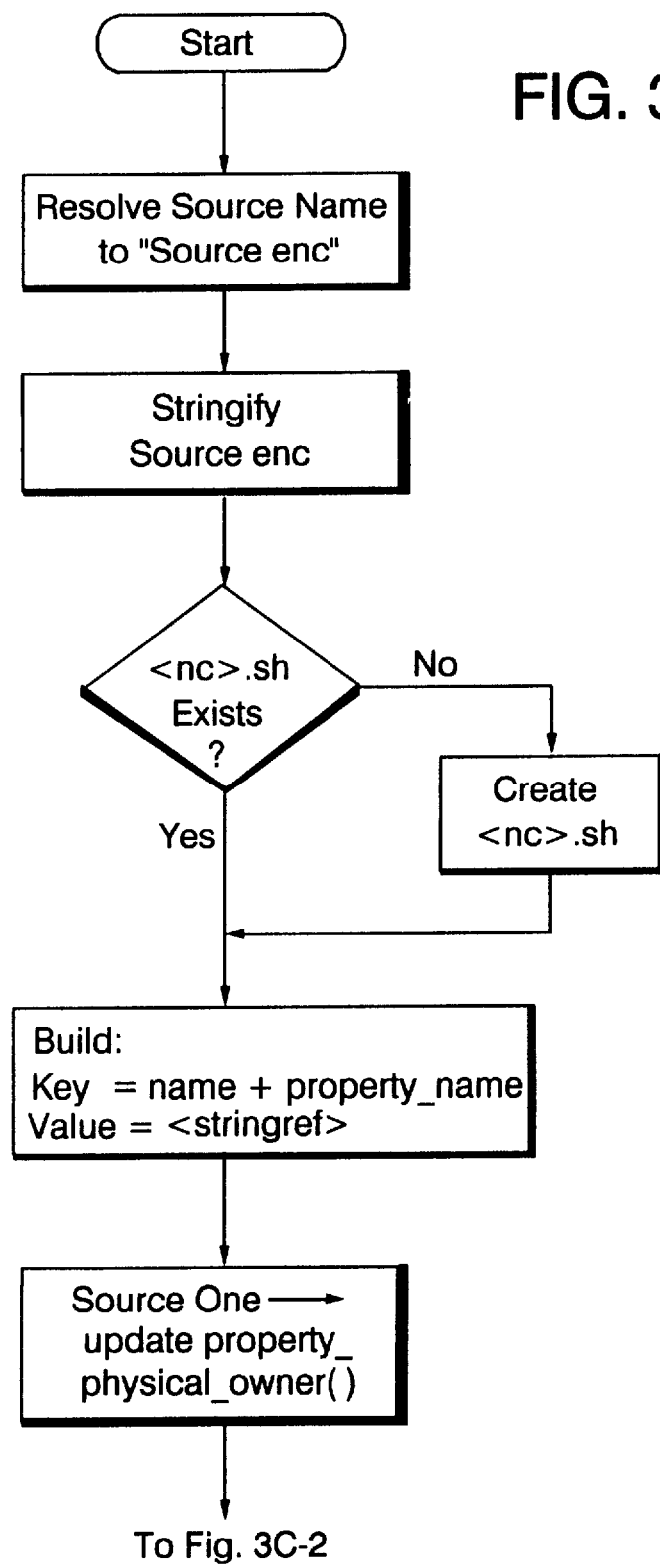
Figures 2, 3C:
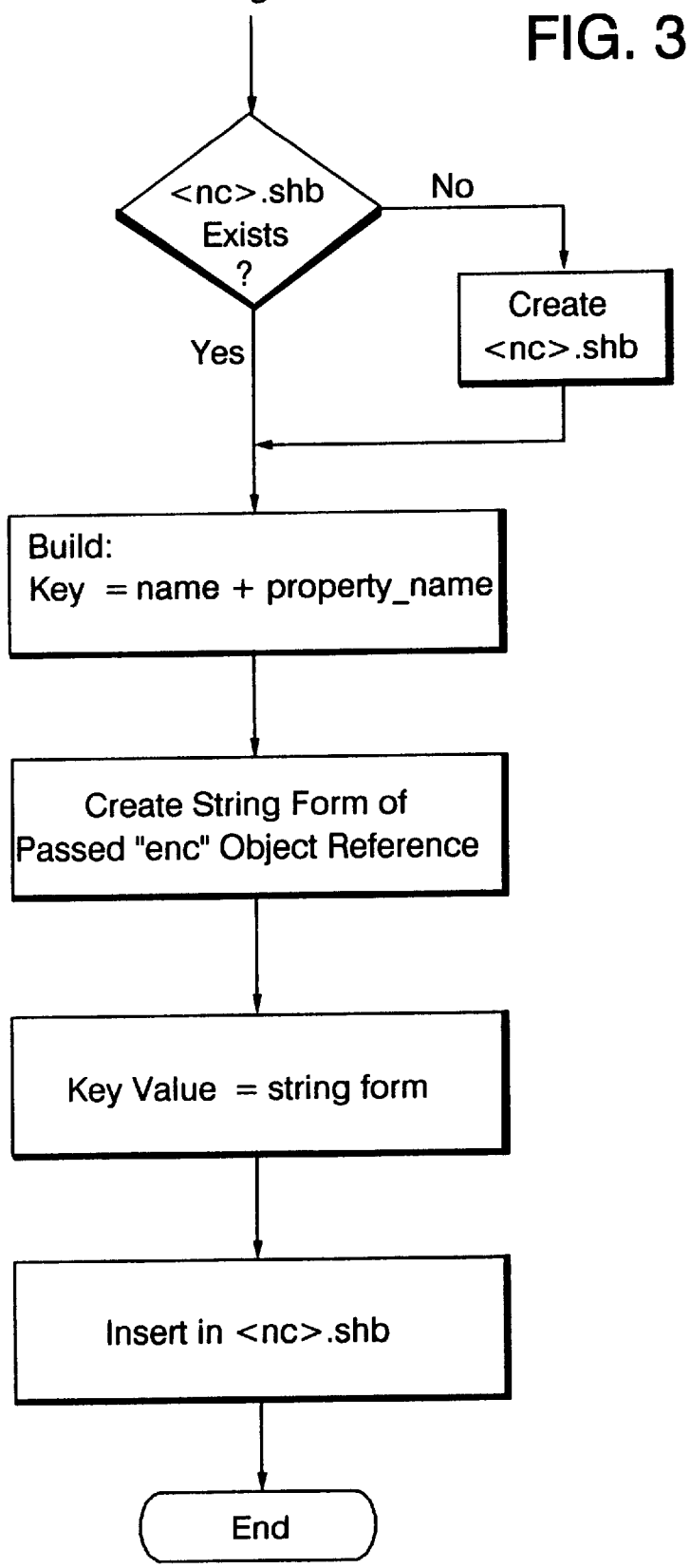

(C) Operations that share a property will perform the following steps: (share_property, share_properties) (See FIG. 3C)

1. Resolve the source name to the leaf source extended naming context.
2. Stringify the source extended naming context.
3. if <nc>.sh file does not exist, create one.
4. build key → binding name + property name.
5. build key-value → stringified reference obtained from step 2.
6. Inform source extended naming context to update the shared-by list to include the target extended naming context and target name. Steps for this action are:
   a. Create a <nc>.shb, if one does not exist.
   b. build key → name + property name.
   c. stringify the passed naming context.
   d. build key value → stringified reference obtained from step c.
   e. insert record in the <nc>.shb file.

Figure 3D:
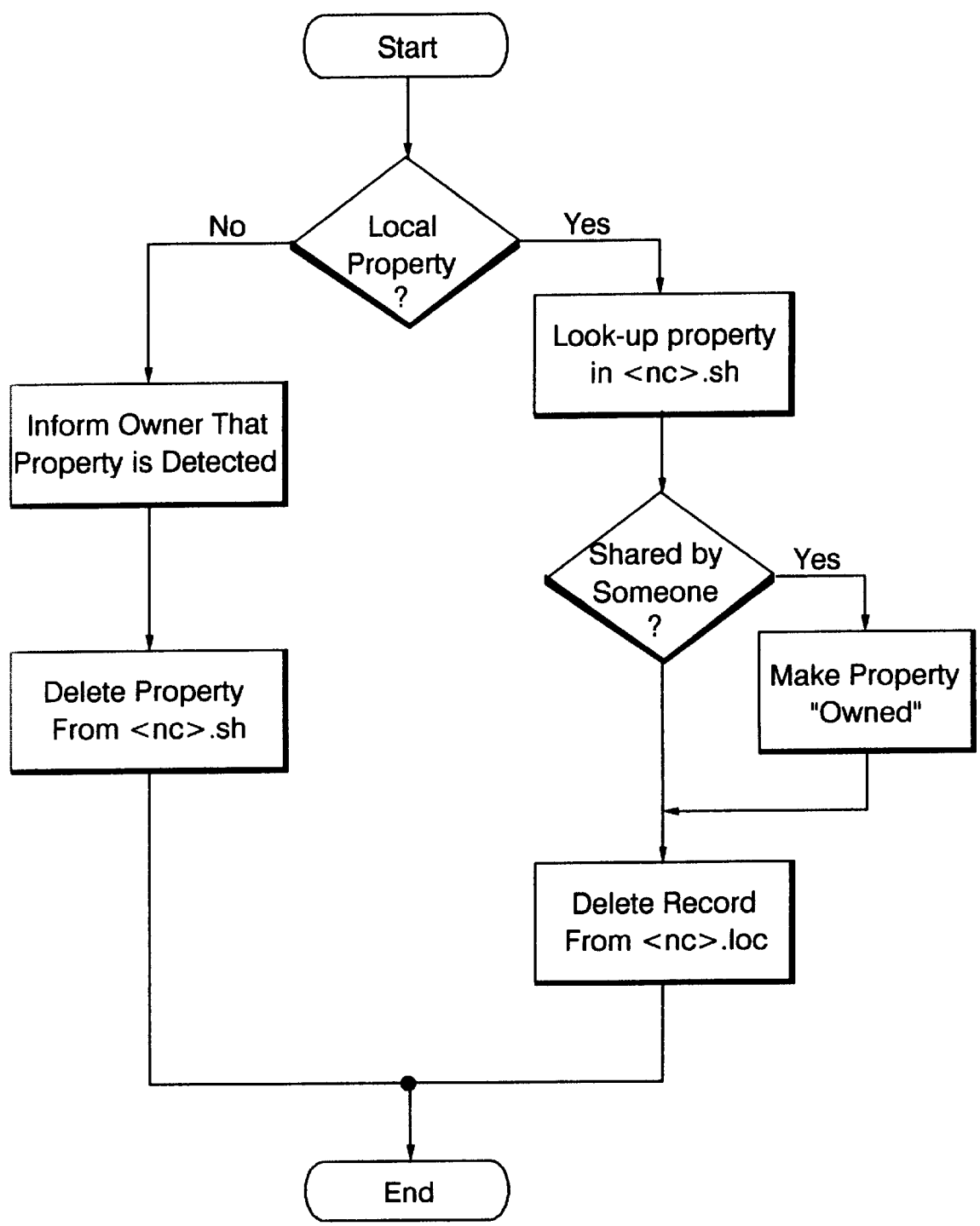

(D) Operations that remove property (remove_property, unshare_property):(See FIG. 3D)

1. if specified property is a local property,
   a. look-up the <nc>.sh file and see if it is shared by someone.
   b. if the property is a shared property, unshare by making the property local (private). This involves deleting the property recorded from the <nc>.sh file and adding an entry in the <nc>.loc file.
   c. delete local property by removing entry from <nc>.loc file
2. if specified property is shared,
   a. inform physical owner that the property is being removed. This should involve removing the stringified objref entry from the <nc>.shb file.
   b. delete shared property by removing entry from <nc>.sh file.

Figure 3E:
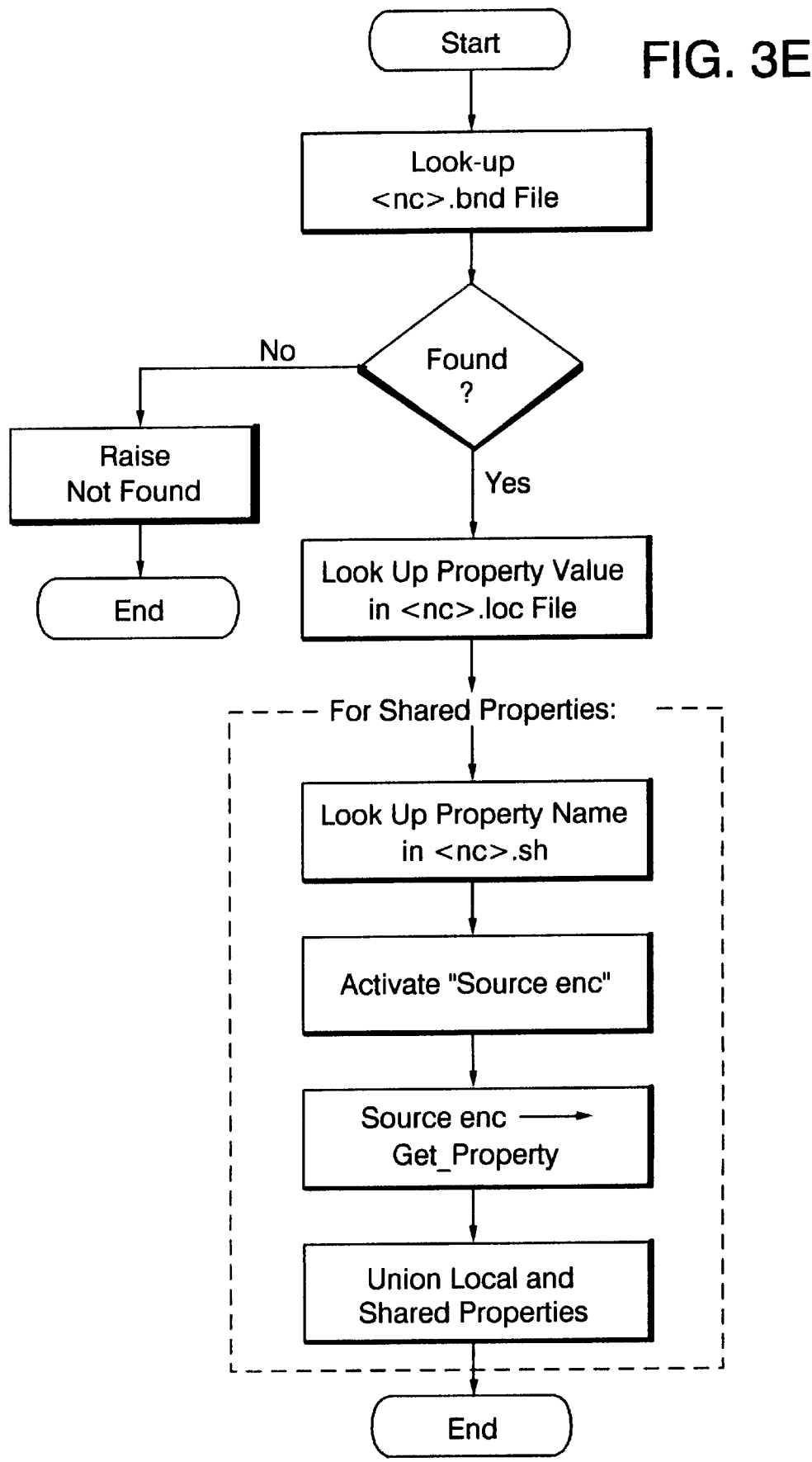

(E) Operations that get properties (like get_property, get_all_properties, get_some_properties, resolve with_properties, resolve_with_property) include the following steps: (See FIG. 3E)

1. resolve the name by searching the <nc>.bnd file and converting the obtained stringified form of the object reference to an object reference.
2. obtain local property in the <nc>.loc file if property is a shared property.
3. for each property in the <nc>.sh file,
   a. activate the stringified source naming context (owner)
   b. ask the owner naming context to return property value
4. union local and shared properties and return The present invention relates to providing a persistent distributed naming service which includes providing persistence of name-property-object bindings.

A persistent distributed object naming service must meet the following requirements:

(a) When a client binds an object in the name space, the client should be able to retrieve the object at a later time;

(b) The name-property-object binding should be saved, even across server failure and restart; and (c) Local, as well as remote, objects should be persistently bound.

The preferred embodiment of the present invention provides a relatively simple solution to the problem set forth above in the Background of the Invention. The naming context object state is modeled as a set of relations which are implemented as B-trees. This modeling makes the naming context stateless, that is, there is no persistent state. Thus, flattening and unflattening operations which are inherently expensive are eliminated. The relations may be enable to take advantage of existing databases.

Figure 4A:
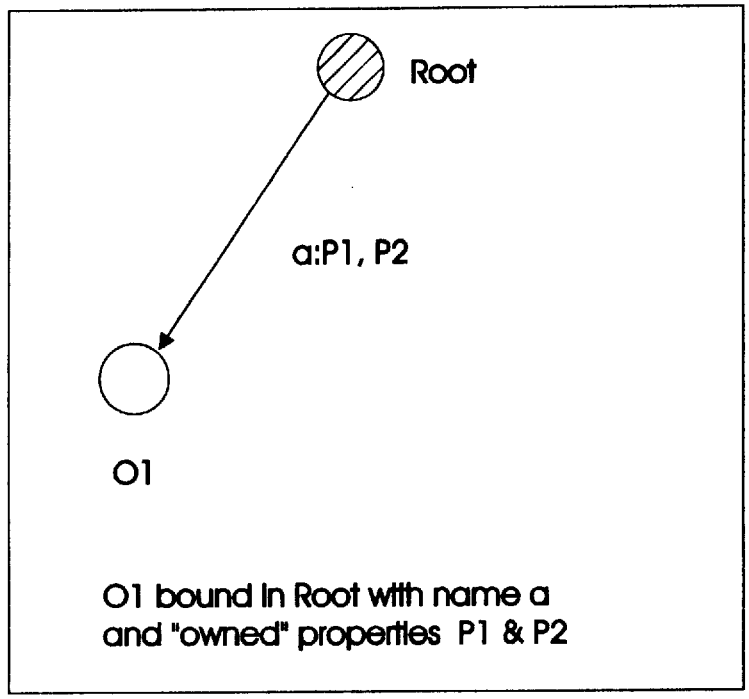
FIG. 4A, B, C and D are diagrams of features in an object oriented naming service.

FIG. 4A, B, C, and D demonstrate features which are offered by a naming service.

FIG. 4A shows owned properties wherein object O1 is bound in the root with a name a and owned properties P1 and P2.

Figure 4B:
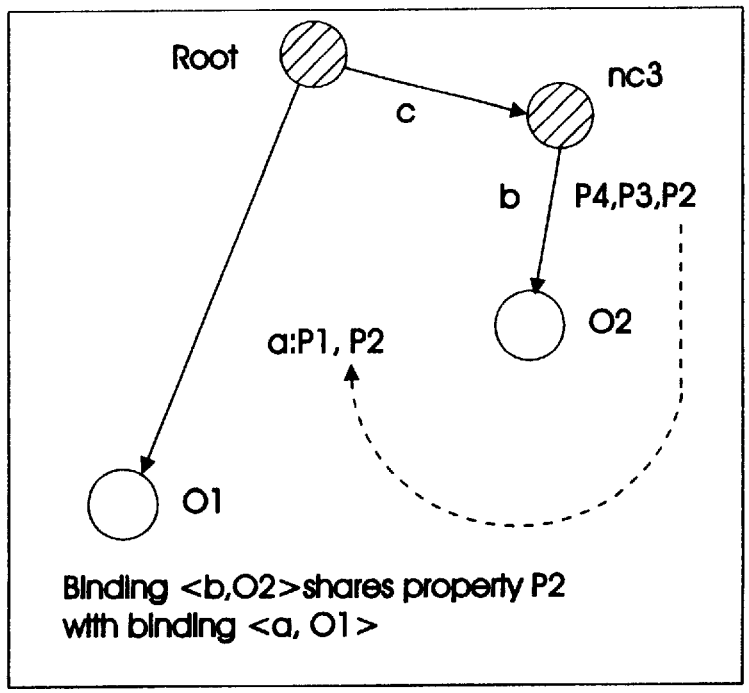

FIG. 4B illustrates shared properties wherein the binding b, object O2 shares property P2 with binding a, O1.

Figure 4C:
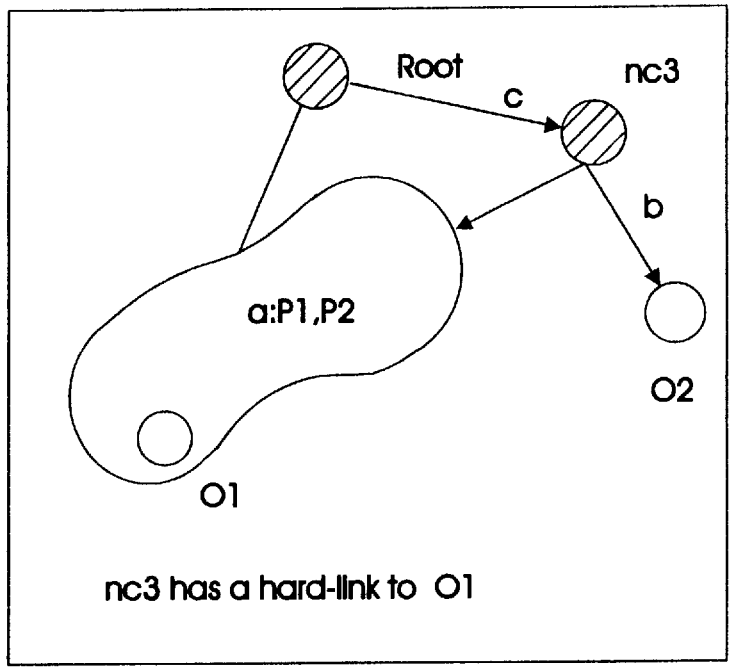

FIG. 4C illustrates shared properties wherein object nc3 has a hard link to name (a) and properties (P1, P2) in O1.

Figure 4D:
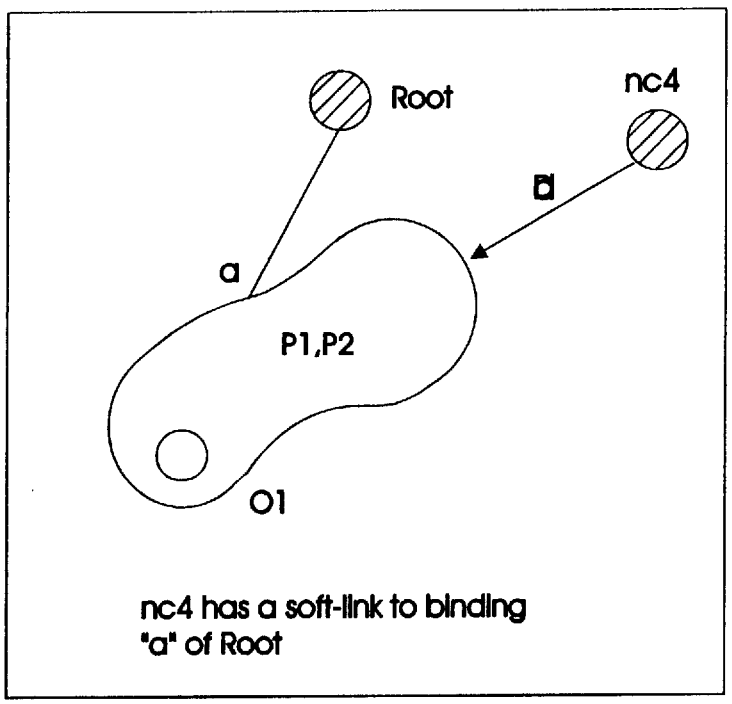

FIG. 4D illustrates shared properties wherein object nc4 has a soft link to properties (P1, P2) but not to name in O1.

Figure 5:
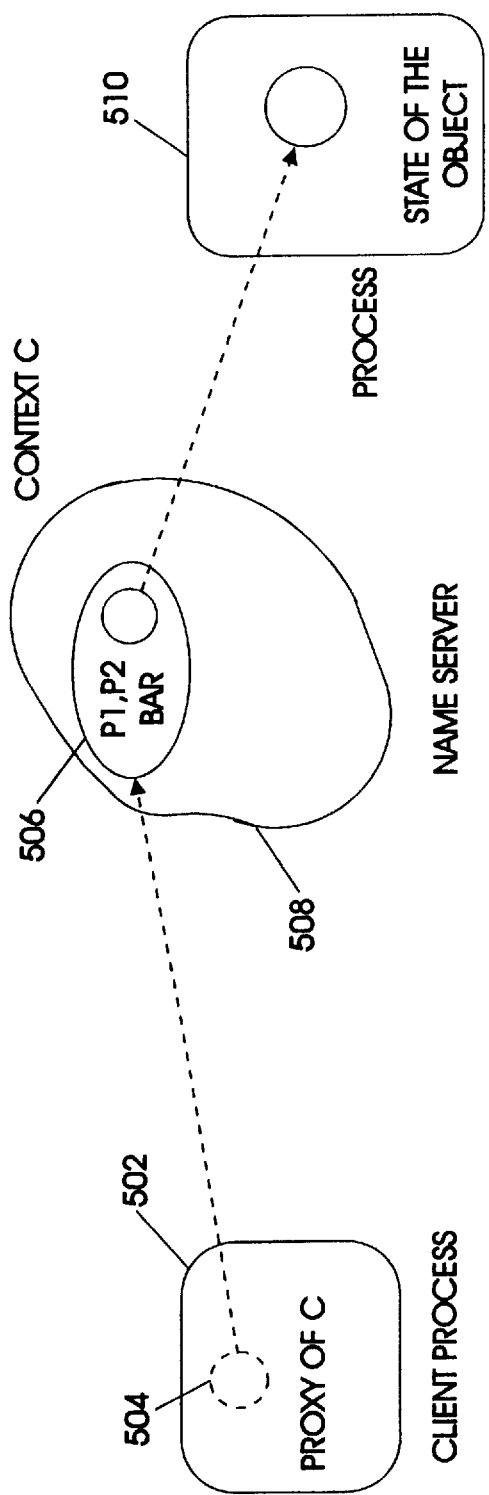
FIG. 5 is a diagram showing name-object-property binding persistence in accordance with the present invention.

Referring now to FIG. 5 name-object-property binding persistence in accordance with the present invention will be described.

A client process 502 contains a proxy 504 of client C. A persistent state 506 of name context C from name to property to object binding is formed in Name Server 508. The persistent state including name-property-object binding is mapped to a structured file system 510 where it is stored.

A naming context object is represented by a set of four files in the structured file system 410. The files are organized to represent the following relationships:

1. Name-object bindings (R1);
2. Owned properties (R2);
3. Shared properties (R3); and
4. Shared by properties (R4).

These files are created in a directory of a file system. A class is defined which models these database files. The four relationships set forth model the domain of the naming context class. Tables 1–4, inclusive, below, show the structure of the relationships.

TABLE 1

Name Bindings (e.g., Root) (.bnd)

| Name | String Mapping of Object Reference |
|---|---|
| a | Object_to_string(O1) |
| c | Object_to_string(nc3) |

TABLE 2

Local Properties (Root) (.loc)

| Name | Property Name | Property Value |
|---|---|---|
| a | P1 | 345.896 |
| a | P2 | "Distributable" |

TABLE 3

Shared Properties (nc3) (.sh)

| Name | Property Name | String-Mapping-Objref | Binding Name |
|---|---|---|---|
| b | P2 | object_to_string(Root) | a |

TABLE 4

SharedByproperties (Root) (.shb)

| Name | Property Name | String-Mapping-Objref | Binding Name |
|---|---|---|---|
| a | P2 | object_to_string(nc3) | b |

Relation 1 (Table 1) represents the name-to-object relationships (binding). The name of the bound object and a representation of the bound object is stored in Table 1. No externalized form of the state of the objects is created. A string mapping of the object is created. If the object happens to be a local object, a "stringified reference" of the local object is created. However, if the bound object happens to be another naming context, a filestem of the files corresponding to the bound naming context is "coerced" into the string mapping. The filestem will allow identification of the index files during name resolution.

When a client attempts to resolve a name on a target naming context, the filestem is retrieved from the target (the filestem is a part of the dynamic state of the object), and Table 1 is searched for the name. If a match is found, the stringified object reference is activated or unmapped, and the reference is returned to the client. If the unmapped object was a naming context, the filestem is stored as the dynamic state of the object.

Relation 2 (Table 2) stores owned properties and the names to which they are associated. Given an object name and a property (both strings), the property value is returned. Property values are stored in a self-describing format. The relation allows operations such as listing properties of an object and obtaining individual properties of a given name-object binding. Remote iterators are provided to step through the property listing.

Relations 3 and 4 (Tables 3 and 4) allow properties to be shared between naming contexts. For example, as described above with respect to FIG. 3B, <NC3:b>shares property P2 from <root:A>. In the target naming context shared file (Table 3), the address (string form of naming context + name) of the source naming context is stored. In the source naming context sharedBy table (Table 4), the address of the sharing context is stored. This permits support of semantics of unsharing properties. These tables also allow links to be established between objects. Objects are not only allowed to share individual properties, they can also share properties and objects bound in another naming context. The shared name could be the same as the source name or different (leading to the concept of hard and soft links). With the above relations, relations R1, 2, and 3 may be stated as follows:

R1 (Name, String-Mapping-Object)
 Primary Key: (Name)
 Functional Dependency: {Name}→String-Mapping-Objref R2 (Name, PropertyName, PropertyValue)
 Primary Key: (Name, PropertyName)
 Functional Dependency: {Name, PropertyName}→PropertyValue R3 (Name, PropertyName, PropertyValue)
  Primary Key: (Name, PropertyName)
  Functional Dependency: {Name, PropertyName}→String-Mapping-Objref →BindingName The present invention employs a simple file system to create database files and directories. These files represent the persistent state of the naming context object. Further, these relations do not contain data redundancy. This capability allows a persistent naming service to be built around any existing datastore, allowing an efficient and scalable persistent naming system.

It will be appreciated that although a specific embodiment of the present invention has been described herein for the purposes of illustration, various modifications may be made without departing from the spirit or scope of the invention. Accordingly, the scope of this invention is limited only by the following claims and their equivalents.

What is claimed is:

1. An information handling system, comprising:
  one or more work stations, each work station comprising:
  one or more processors;
  a storage system;
  one or more I/O controllers;
  a system bus connecting the processors, the storage system and the I/O controllers;
  an operating system program for controlling operation of the information handling system; and
  an object based program operating in association with the operating system program for controlling execution of program modules representing one or more objects, the object based program comprising:
  means for establishing a name resolution context,
  means for binding a plurality of objects to said name resolution context, and
  means for mapping said name resolution context to a persistent, distributed object name service having a relational structure.

2. A system according to claim 1, wherein the means for mapping a persistent, distributed object name service further comprises:
  means for mapping name, property, object bindings.

3. A system according to claim 2, wherein the means for mapping a persistent, distributed object name service further comprises:
  means for creating a bind file for an object to be bound if a bind file does not exist;
  means for creating a stringified object reference of the object to be bound; and
  means for inserting a record in the bind file.

4. A system according to claim 3, wherein the means for inserting a record further comprises:
  means for inserting a name and a stringified reference in the bind file.

5. A system according to claim 2, wherein the object based program further comprises:
  means for creating a name context file if a name context file does not exist for an object to be bound;
  means for building a key comprising a binding name and a property name;
  means for building a key-value comprising a sharable flag and a property value; and
  means for inserting the key and the key value in the name context file.

6. A system according to claim 1, further comprising:
  means for resolving a source name to an extended naming context;
  means for stringifying the extended naming context;
  means for creating a name context shared file, if a name context shared file does not exist;
  means for building a key comprising a binding name and a property name;
  means for building a key-value comprising a stringified reference;
  means for informing an extended naming context to update a shared-by list to include a target extended naming context and target name.

7. A system according to claim 6, further comprising:
  means for creating a name context shared-by file, if one does not exist;
  means for building a key comprising a name and a property name;
  means for stringifying a passed naming context;
  means for building a key value comprising a stringified reference obtained from the means for stringifying; and
  means for inserting a record comprising the key and the key value in the name context shared-by file.

8. A system according to claim 1, further comprising:
  means for determining if a specified property is a local property; and
  means for determining if the specified property is shared.

9. A system according to claim 8, wherein the means for determining if a specified property is a local property further comprises:
  means for looking up the name context shared file to determined if it is shared;
  means for unsharing the name context file by making the property local if the property is a shared property; and
  means for deleting the local property by removing an associated entry from the name context local file.

10. A system according to claim 8, wherein the means for determining if a specified property is a shared property further comprises:
  means for informing an owner that the property is being removed; and
  means for deleting a shared property by a corresponding removing entry from the name context shared file.

11. A system according to claim 1, further comprising:
  means for resolving a name by searching a name context bind file and converting an obtained stringified object reference to an object reference; and
  means for obtaining a local property in the name context local file if the property is a shared property.

12. A computer readable medium, comprising:
  means for modeling a naming context object state as a set of relations;
  means for managing a persistent distributed object name service using a preexisting record database, said means for managing having:
  means for mapping the set of relations to the preexisting record database, said means for mapping including:
  means for binding a name to an object in a first relation;
  means for associating one or more properties with the name in a second relation; and
  means for sharing one or more properties among one or more objects in a third and a fourth relation.

13. A computer readable medium according to claim 12, wherein said means for binding comprises:
   means for creating a bind file for an object to be bound if a bind file does not exist;
   means for creating a stringified object reference of the object to be bound; and
   means for inserting a record in the bind file.

14. A computer readable medium, according to claim 13, wherein the means for inserting a record further comprises:
   means for inserting a name and a stringified reference in the bind file.

15. A computer readable medium according to claim 12, wherein said means for associating comprises:
   means for creating a name context file if a name context file does not exist for a object to be bound;
   means for building a key comprising a binding name and a property name;
   means for building a key-value comprising a sharable flag and a property value; and
   means for inserting the key and the key value in the name context file.

16. A computer readable medium according to claim 12, wherein said means for sharing comprises:
   means for resolving a source name to an extended naming context;
   means for stringifying the extended naming context;
   means for creating a name context shared file, if a name context shared file does not exit;
   means for building a key comprising a binding name and a property name;
   means for building a key-value comprising a stringified reference; and
   means for informing an extended naming context to update a shared-by list to include a target extended naming context and target name.

17. A computer readable medium according to claim 16, wherein said means for informing comprises:
   means for creating a name context shared-by file, if one does not exist;
   means for building a key comprising a name and a property name;
   means for stringifying a passed naming context;
   means for building a key value comprising a stringified reference obtained from said means for stringifying; and
   means for inserting a record comprising the key and the value in the name context shared-by file.

18. A computer readable medium according to claim 12, further comprising means for removing a specified property.

19. A computer readable medium according to claim 18, wherein said means for removing comprises:
   means for determining if the specified property is a local property; and
   means for determining if the specified property is shared.

20. A computer readable medium, according to claim 19, wherein the means for determining if a specified property is a shared property further comprises:
   means for informing an owner that the property is being removed; and
   means for deleting a shared property by a corresponding removing entry from the name context shared file.

21. A computer readable medium according to claim 12, further comprising means for obtaining a property.

22. A computer readable medium according to claim 21, wherein said means for obtaining a property comprises:
   means for resolving a name by searching a name context bind file and converting an obtained stringified object reference to an object reference; and
   means for obtaining a local property in the name context local file if the property is a shared property.

23. A computer implemented method for managing a distributed name service, the method comprising the steps of:
   modeling a naming context object state as a set of relations;
   managing a persistent distributed object name service by mapping said set of relations to a preexisting record database by:
   binding a name to an object in a first relation;
   associating one or more properties with the name in a second relation; and
   sharing one or more properties among one or more objects in a third and a fourth relation.

24. A method according to claim 23, wherein said binding step comprises the steps of;
   creating a bind file for an object to be bound if a bind file does not exist;
   creating a stringified object reference of the object to be bound; and
   inserting a record in the bind file.

25. A method, according to claim 24, wherein the step of inserting a record further comprises the step of:
   inserting a name and a stringified reference in the bind file.

26. A method according to claim 23, wherein said associating step comprises the steps of:
   creating a name context file if a name context file does not exist for an object to be bound;
   building a key comprising a binding name and a property name;
   building a key-value comprising a sharable flag and a property value; and
   inserting the key and the key value in the name context file.

27. A method according to claim 23, wherein said sharing step comprises the steps of:
   resolving a source name to an extended naming context;
   stringifying the extended naming context;
   creating a name context shared file, if a name context shared file does not exist;
   building a key comprising a binding name and a property name;
   building a key-value comprising a stringified reference; and
   informing an extended naming context to update a shared-by list to include a target extended naming context and target name.

28. A method according to claim 27, wherein said informing step comprises:
   creating a name context shared-by file, if one does not exit;
   building a key comprising a name and a property name;
   stringifying a passed naming context;
   building a key value comprising stringified reference obtained from the stringifying step; and inserting a record comprising the key and the key value in the name context shared-by file.

29. A method according to claim 23, further comprising the step of removing a specified property.

30. A method according to claim 29, wherein said removing step comprises the steps of:

determining if the specified property is a local property; and determining if the specified property is shared.

31. A method, according to claim 30, wherein the determining if a specified property is a shared property step further comprises the steps of:

informing an owner that the property is being removed; and deleting a shared property by a corresponding removing entry from the name context shared file.

32. A method according to claim 23, further comprising the step of obtaining a property.

33. A method according to claim 32, wherein said step of obtaining a property comprises the steps of:

resolving a name by searching a name context bind file and converting an obtained stringified object reference to an object reference; and obtaining a local property in the name context local file if the property is a shared property.

* * * * *